(12) United States Patent
Panther

(10) Patent No.: US 6,463,954 B1
(45) Date of Patent: Oct. 15, 2002

(54) HYDRAULIC CONTROL DEVICE

(75) Inventor: Urban Panther, Seelbach (DE)

(73) Assignee: LuK Lamellen und Kupplungsbau Beteiligungs KG, Buhl/Baden (DE)

( * ) Notice: Subject to any disclaimer, the term of this patent is extended or adjusted under 35 U.S.C. 154(b) by 0 days.

(21) Appl. No.: 09/657,834

(22) Filed: Sep. 8, 2000

(30) Foreign Application Priority Data

| Sep. 9, 1999 | (DE) | 199 43 012 |
| Sep. 9, 1999 | (DE) | 199 43 009 |
| Sep. 13, 1999 | (DE) | 199 43 680 |
| Sep. 14, 1999 | (DE) | 199 43 927 |

(51) Int. Cl.[7] .............................................. F15B 13/02
(52) U.S. Cl. .............. 137/316; 137/315.09; 137/625.69
(58) Field of Search .......................... 137/315.09, 316, 137/625.69

(56) References Cited

U.S. PATENT DOCUMENTS 5,085,102 A  *  2/1992  Iwase et al. ........ 137/625.69 X

* cited by examiner

Primary Examiner—Gerald A. Michalsky
(74) Attorney, Agent, or Firm—Darby & Darby

(57) ABSTRACT

A hydraulic control device for a transmission of a motor vehicle has a housing with a bore hole and a valve piston that is contained in the bore hole and slidable between different axial positions. The shift levels of the transmission are determined by setting the axial position of the valve piston. Prior to installation of the control device on another part of the motor vehicle, the valve piston is secured by a safety element against axial movement. Installation of the control device causes the safety element to release the valve piston.

16 Claims, 4 Drawing Sheets

HYDRAULIC CONTROL DEVICE

BACKGROUND OF THE INVENTION

The invention relates to a pressure-medium-operated control device, specifically a hydraulic control device, in particular for controlling a transmission of a motor vehicle.

A hydraulic control device of this kind has a valve piston in a housing to set the shift levels of the transmission The valve piston Is arranged to slide axially in a bore hole of the,housing, and the shift levels of the transmission are determined by setting the axial position of the valve piston. A control device of this kind has become known from DE 198 26 747 which is hereby included by reference as additional background of the present application Sliding valve pistons of the aforementioned kind can be operable manually, or they can be automated to set and hold the transmission at the desired shift level. For example, a transmission may be shiftable between the shift levels D, R, N and P, but the selection could also include additional settings. The letter D stands for "forward Drive with automatic gear selection", R stands for "Reverse", N stands for "Neutral" (where the torque flow between the engine and the transmission output shaft is interrupted), and P stands for "Park", i.e., the shift level where the transmission output is locked.

In motor vehicles with transmissions that have a hydraulic control device of the aforementioned kind, the components of the vehicle are individually separate until they become connected in the assembly process. In the assembly step where the control device with the valve piston is installed on the transmission housing or at another place in the motor vehicle, it is possible for the valve piston to become dislodged from its correct, preset position, so that the actuator element for the valve piston cannot be connected correctly to the valve piston in the assembly process. The special steps required to achieve a correct connection between the valve piston and the actuator in this case will add to the cost and complexity of the assembly process.

The dislodgement of the valve piston from its correct position during transport can be caused, e.g., by vibrations or by holding the control device in a non-horizontal position.

OBJECT OF THE INVENTION

It is therefore the object of the present invention, to provide a control device that allows a sound installation and will function reliably after it has been installed.

Furthermore, these improvements of the control device are to be achieved in an uncomplicated and cost-effective manner.

SUMMARY OF THE INVENTION

In a hydraulic control device according to the invention, the foregoing objective is met by an arrangement where, prior to installing the control device housing on the transmission housing or on another component of the vehicle, the axial position of the valve piston in the control device housing is retained by a safety element, and where the retaining function of the safety element is automatically canceled as a result of the installation.

It is advantageous if the safety element is a swivel lever which on a first lever arm, has a fork that is engaged by a projection or collar of the valve piston. This engagement allows the valve piston to be secured in its axial position. In another embodiment, it is practical if the lever arm has a nose or finger that enters into a recess in the surface of the valve piston or between two raised collars of the valve piston and thereby secures the axial position of the valve piston.

According to a further concept within the scope of the invention, it is advantageous if the swivel lever has a second lever arm which, in the process of installing the control device on the transmission housing or on another component of the vehicle, is pushed or moved out of position, whereby the first lever arm with the fork or finger is removed from engagement, so that the valve piston is set free to move in the axial direction.

It is practical to configure the safety element in the form of a two-armed lever. In another embodiment, it is practical if,the lever is a one-armed lever.

It is particularly advantageous, if the safety element is configured as a two-armed lever, where the second lever arm is connected to a spring element that biases the fork or the finger of the first lever arm against the valve piston.

It is further practical, if the spring element is connected to the housing of the control device, e.g., by one or more screws.

It is particularly advantageous if the lever and the spring element are configured as a single integral component. In another embodiment, the lever and the spring element are designed as two components.

According to a further concept of the invention, it is practical if the safety element, such as a lever with or without spring element, is designed as a sheet metal part produced, e.g., by punching and bending. This will make the part particularly simple to manufacture. It is further practical if the safety element, such as a lever with or without spring element, is made of spring steel.

It is further practical if, in comparison to each other, the lever is designed to be inflexible with respect to bending while the spring is designed to be resiliently flexible.

It is particularly advantageous if the lever is swivelably mounted on or by means of a ridge of the housing of the control device. To allow the lever to be more securely positioned, the ridge can have a slot or groove in which the lever is supported. It can be advantageous if the slot or groove is formed in the casting of the housing of the control device or machined after the casting process, e.g., by milling or drilling.

It is advantageous, if the secured condition of the valve piston is automatically released as a result of connecting the control device to the transmission.

In accordance with a further concept of the invention, it is advantageous if the spring element and a holder element of a further component of the control device or the transmission are formed together as one integral unit.

In practice, the holder element that is connected or integrally formed with the spring element can be a retainer fork that engages and thereby axially secures a tube-shaped element. It is also advantageous if the retainer fork, the spring element and the lever are designed as one integral unit.

It is advantageous if the tube-shaped element is part of a hydraulic connection between the control device and a rotating part of the transmission, e.g., of a transmission shaft.

The novel features that are considered as characteristic of the invention are set forth in particular in the appended claims. The improved apparatus itself, however, both as to its construction, and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

The details of the invention will be discussed on the basis of the attached drawing, wherein.

DETAILED DESCRIPTION OF THE INVENTION

Figure 1:
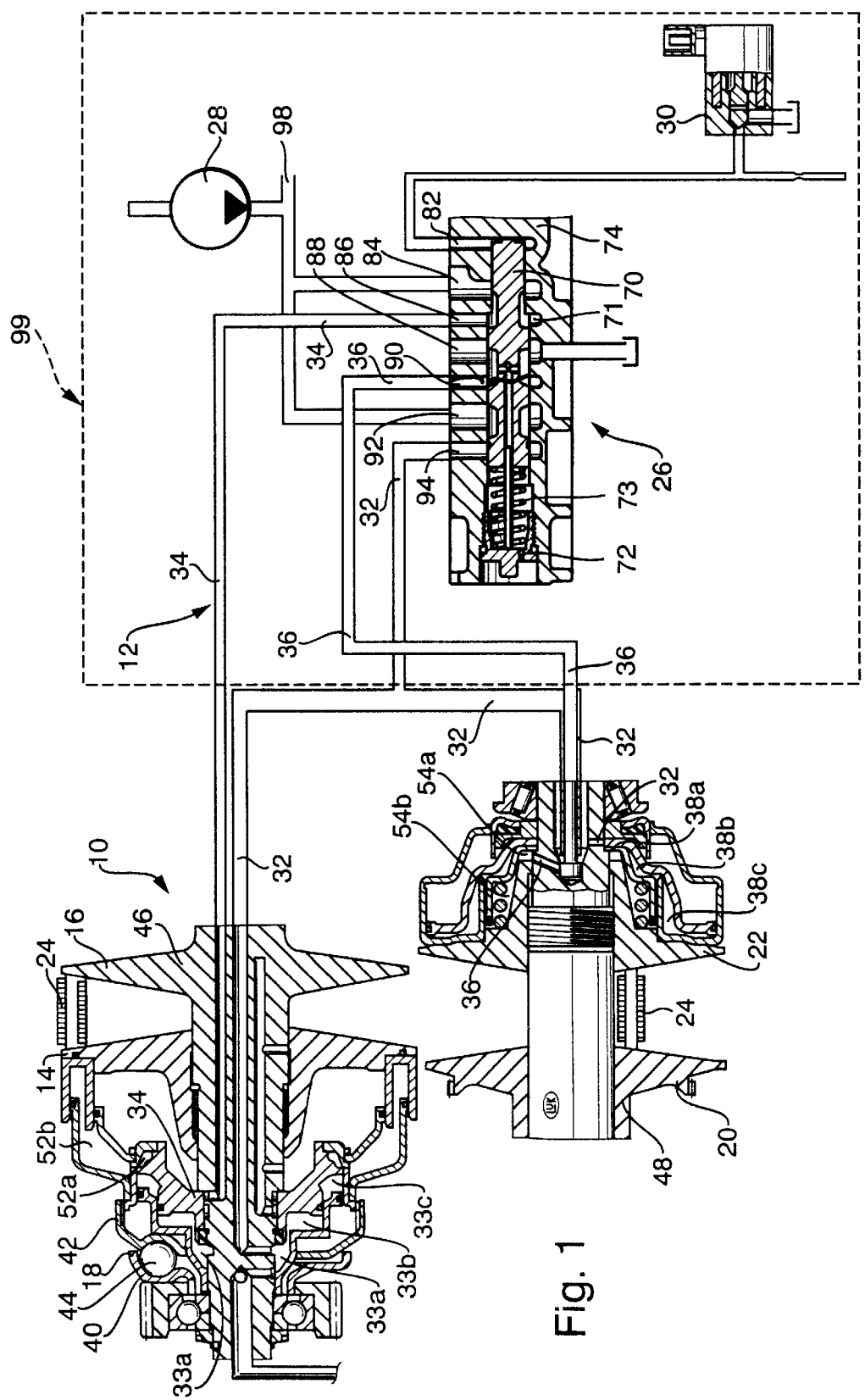
FIG. 1 represents a transmission with a hydraulic system including a valve.

FIG. 1 gives a schematic view of a first embodiment serving as an example of the invention. The continuously variable transmission 10, as used specifically in a motor vehicle (not shown), is controlled by a hydraulic system 12 in the illustrated arrangement.

In particular, the continuously variable transmission 10 has a first pair of pulley discs 14, 16 with a torque-sensor device 18, a second pair of pulley discs 20, 22, as well as a torque-transmitting device in the form of a chain 24 that runs in a loop around the disc pairs.

The first disc pair 14, 16 has a conical disc 16 arranged essentially in an axially fixed position, and a conical disc 14 which, in the illustrated example, is arranged of be axially movable on the fixed conical disc 16. In a preferred arrangement, the distance from the disc pair 14, 16 to the disc pair 20, 22 is variable. With particular preference, however, the disc pairs are at a fixed distance from each other.

In particular, a non-variable distance between the disc pairs has the effect that by closing one disc pair, i.e., by narrowing the gap either between the discs 14 and 16 or between the discs 20 and 22, the chain 24 is caused to migrate radially outwards in the narrowing gap. However, because the chain has a defined, invariable length, the outward radial migration of the chain at one of the disc pairs 14, 16 or 20, 22, respectively, causes a commensurate inward migration of the chain at the other disc pair 20, 22 or 14, 16, respectively, at least in the assumed case of an invariable distance between the disc pairs. The inward radial migration, in turn causes the respective disc pair to open, i.e., to increase the gap between the discs of that pair.

Thus, when the discs of one of the pairs 14, 16 or 20, 22 are closed or pushed together, this has the effect of opening or pushing apart the other disc pair. Because the opening and closing of the disc pairs is accompanied by a change in the contact radius with the chain, i.e., the radius at which the force is transferred, the result is a change of the transmission ratio of the transmission 10. Depending on whether an external force is applied to the disc pair 14, 16 or the disc pair 20, 22, the transmission is shifted, respectively, in the direction towards "overdrive" or the direction towards "underdrive". It should be noted that this applies to the illustrated example of FIG. 1, where the disc pair 14, 16 is arranged at the input side, i.e., the driven side of the transmission, while the disc pair 20, 22 is arranged at the output side.

It should be noted that the aforementioned shift movements of the discs are attributable to a net resultant force imbalance. This means in particular, that a force applied to one of the disc pairs will not cause a transmission shift, if a substantially equal force is applied to the other disc pair. For further clarification, there will also be no shifting movement in the disc pairs, even if the external forces applied to the movable discs 14 and 10 are unequal, if the disc pairs are overall in equilibrium.

The shifting movement of the disc pairs or, more precisely, the application of a corresponding shifting force according to, the invention is performed in particular by the hydraulic system 12.

The hydraulic system 12 has a special two-fold function.

On the one hand, the hydraulic system generates a ratio-maintaining pressure on the disc pairs 14, 16 and 20, 22. The ratio-maintaining pressure ensures that a preset ratio of the transmission 10 remains unchanged, particularly while the transmission is running, unless a ratio shift is expressly called for.

On the other hand, the hydraulic system also serves to change the setting of the transmission ratio. This particular purpose is accomplished by applying an additional amount of pressure to one of the pairs of conical discs. In particular, the additional pressure is applied to the disc pair where at that point in time the chain 24 is running at a smaller contact radius. However, it should be noted that other ways of applying pressure to the discs are also within the scope of preferred embodiments. The aforementioned way of applying pressure is indicated, e g., in the case where the chain is pushed radially outwards when an axial force is applied to the respective disc pair 14, 16 or 20, 22.

The control of the ratio-maintaining pressure and the ratio-shifting pressure is performed by a valve device 26. The valve device 26 is connected on the one hand to a hydraulic source 28 and, on the other hand, to a proportional valve device 30 that generates a biasing pressure. The downstream side of the valve device 26 (which will be explained in more detail in the context of FIG. 2) in the hydraulic flow is connected to the hydraulic conduit systems 32, 34, 36.

In particular, the valve device 26 allows the control of the intensity and/or direction of the volume flow through the hydraulic conduit systems 32, 34, 36.

The opposite or downstream ends (in relation to the valve device 26) of the hydraulic conduit systems 32, 34, 36 are connected to chambers or chamber systems that are associated with or included in the transmission 10.

Thus, a compressive contact force, preferably controllable in magnitude, is generated in the disc pairs 14, 16 and 20, 22 through the pressure conduit 32 and the chamber systems 33a, 33b, 33c and 38a, 38b, 38c.

Preferably, the torque sensor 18 is used to regulate, control or set the compressive contact force dependent on engine torque.

For example, the torque sensor can have a first, axially fixed part 40 and a second, movable part 42, with the two parts arranged to be rotatable in relation to each other at least through a segmental angular range. At least one of the two parts 40 and 42 has a curve disc or axially rising ramp. A gap-holder body, shown as a ball 44 in the illustrated example, is arranged between the two parts.

The amount of rotation of the second element 42 in relation to the first element 40 depends on the amount of engine torque or, more precisely, on the amount of torque applied to the torque sensor 18. The rotation causes the ball 44 to move up the ramp, thereby increasing the distance between the axially fixed element 40 and the axially movable element 42. This increase in distance is accompanied by a volume change of at least one of the chambers 33*a*, 33*b*, 33*c*, but particularly of the chamber 33*a*. Tied at least in part to the volume change, the pressure will change in at least one of the chambers 33*a*, 33*b*, so that a contact pressure or contact force can be generated that depends at least in part on the torque level present at the input of the transmission.

For example, this arrangement allows a "symmetric" force to be generated on both of the disc pairs 14, 16 and 20, 22. This creates a tendency of pushing the chain 24 radially outwards at both disc pairs 14, 16 and 20, 22 simultaneously. Especially in the case where the resultant forces acting on the chain 24 at each disc pair are symmetric, the effect is that the chain will be held in place, also in relation to the radial direction. In particular, an adhesive friction force is acting between the chain 24 and the disc pairs 14, 16 and 20, 22. Due to these friction forces, it is possible to transmit a torque from the disc pair 14, 16 to the other disc pair 20, 22.

The transmission ratio between the shafts 46 and 48, i.e., between the disc pairs 14, 16 and 20, 22 can be changed by applying a ratio-changing pressure to the disc pairs 14, 16 or 20, 22 by means of the valve device 26 and the hydraulic conduit systems 36 or 34, respectively. In particular, the concept includes the provision that a ratio change in a first direction is effected by pressurizing a system consisting of at least one chamber through the hydraulic conduit system 34. As described above, the conical discs 14, 16 will thereby be pushed closer together while, at the same time, the pressure communicated through the ratio-changing conduit 36 to the disc pair 20, 22 is essentially zero.

Analogously, a ratio change in the opposite direction is achieved by pressurizing at least one of the chambers 54*a*, 54*b* through the conduit system 36, whereby the radial distance of the chain 24 from the shaft of the disc pair 20, 22 is increased. At the same time, this has the effect of contracting the contact radius of the chain at the first disc pair 14, 16, so that the chain 24 moves radially inwards towards the axis of rotation.

It should be noted that the ratio-changing conduits 34, 36 which allow in particular the application of increased pressure to one of the disc pairs 14, 16 or 20, 22 can also be used to maintain an existing equilibrium position of the chain between the disc pairs 14, 16 and 20, 22. For example, with a constant pressure being applied in preferably equal magnitude to both of the disc pairs 14, 16 and 20, 22 through the conduit system 32, an additional pressure for maintaining the aforementioned equilibrium can be superimposed through the conduits 36 or 34, for example in a case where the force required on the disc pairs 14, 16 and 20, 22 depends on the selected transmission ratio. As an example, if the forces required for maintaining equilibrium in the disc pairs 14, 16 and 20, 22 are of different magnitude, it is possible to pressurize at least one of the disc pairs 14, 16 or 20, 22 with an additional, superimposed pressure through the hydraulic conduit 34 or 36, respectively, to secure an equilibrium position in a case where the latter is ratio-dependent.

The valve 26 consists of a valve piston 70 received and axially movable in a long bore hole 71. In the illustrated exemplary embodiment of FIG. 1, the valve piston 70 can be subjected to an axially directed pressure force acting in opposition to the resilient force of the spring 73. The end of the long bore hole 70 can be closed off by means of a plug 72 which can, e.g., be screwed into an internal thread of the bore hole 71 in the control device housing 74.

The system portion 99 that is framed by a broken line in FIG. 1 can be enclosed in a housing as a hydraulic control device module. In addition, the pump 28 can be bolted onto the hydraulic control device module.

Figure 2:
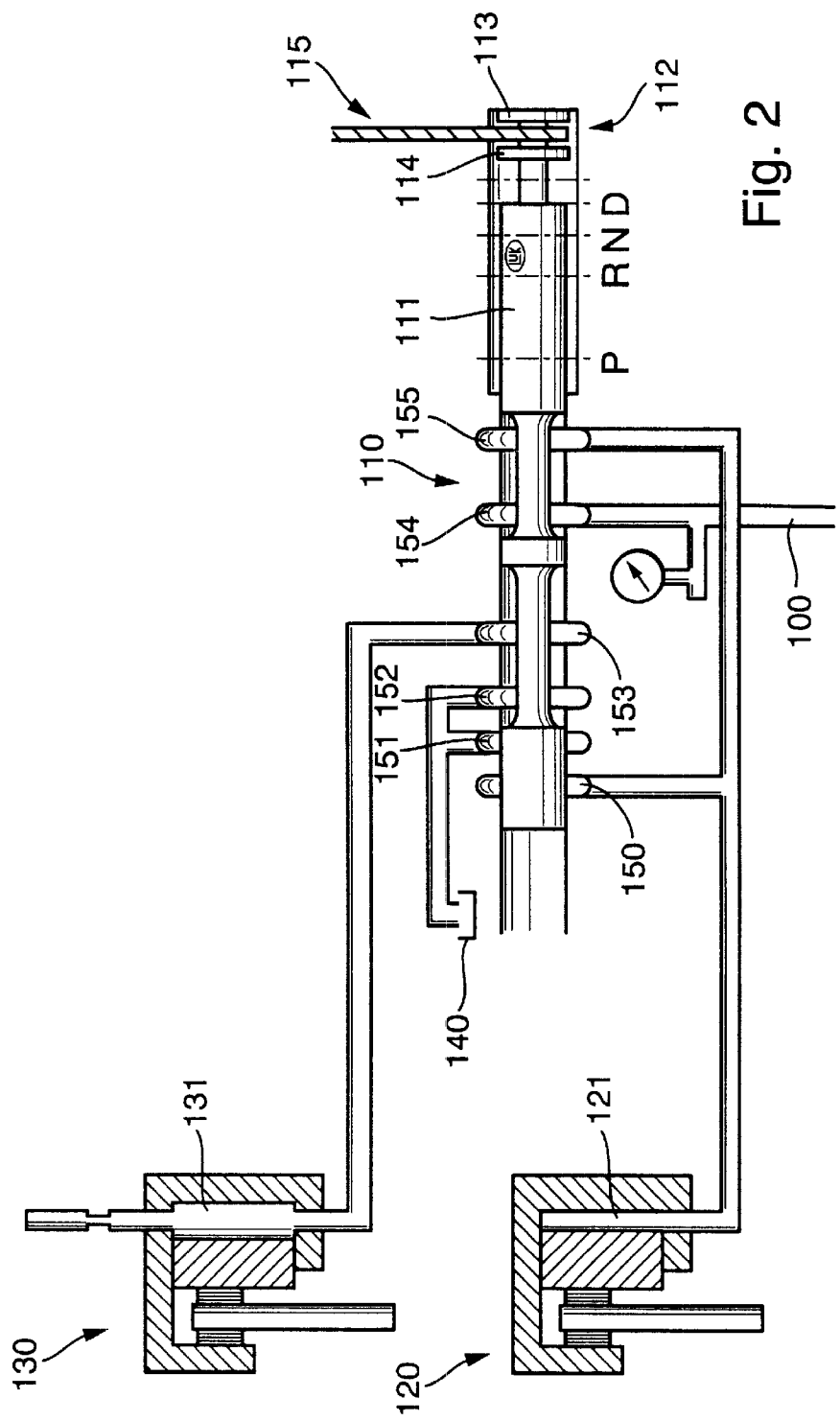
FIG. 2 represents a valve piston for the control of clutches.

The control device of FIG. 1 has a conduit 98 that can be connected to the conduit 100 of FIG. 2. Through conduit 100, the valve 110 with the valve piston 111 receives pressure for actuating the clutches 120 and 130. Depending on the position of the piston 111, either the pressure chamber 121 or 131 or both are pressurized or depressurized and drained to the reservoir or sump 140. The position of the valve piston 111 in relation to the port openings 150, 151, 152, 153, 154 and 155 of the housing controls the draining and/or pressurizing of the actuating elements 121 and 131 of the clutches 120 and 130.

The valve piston 111 has an end portion 112 with two collars or flanges 113 and 114 engaging an actuator arm 115 that reaches between the collars or flanges. By moving or swiveling the arm 115, the valve piston 111 is moved axially in its bore hole, whereby the pressure of the actuating members of the clutches is controlled.

Figure 3:
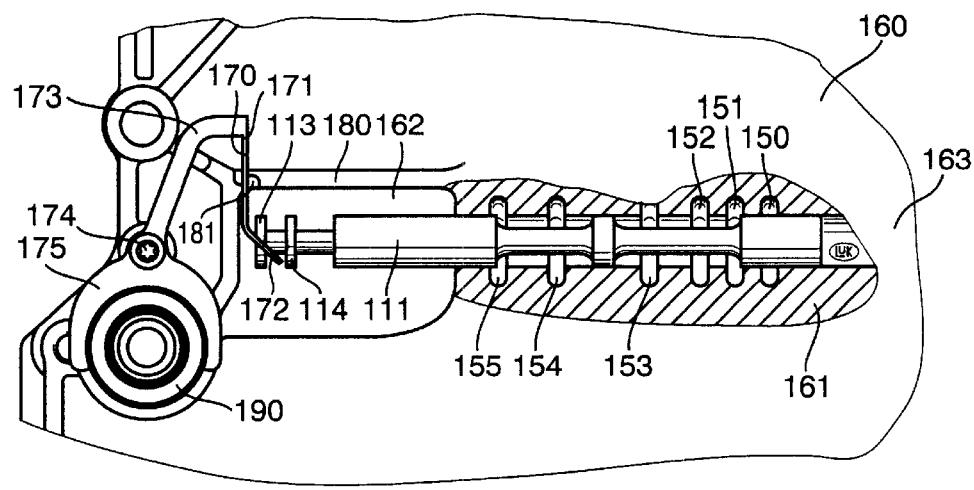
FIG. 3 represents a valve piston with a safety element.

FIG. 3 illustrates a portion of a control device 160, where the shaded area 161 represents a cut portion of the device where the valve piston 111 runs inside its bore hole, and the area 162 represents a material-free opening where the valve piston is exposed to the outside. The connections for the port holes 150 to 155 are analogous to FIG. 2, but are not shown in FIG. 3. FIG. 3 illustrates the safety element 170 with its two lever arms 171 and 172, with the lever 170 being swivelably supported in a slot 181 of the ridge 180 of the housing. The upper end of the second lever arm 171 is connected to a spring element 173 which acts on the lever 170 in such a way that the fork or nose of the first lever arm 172 is pushed against the valve piston or in the direction towards the valve piston. The spring element 173 is connected by a screw 174 to the housing 163 of the control device 160.

The lever arm 172 has a bent shape, so that the fork of the lever arm is aligned in conformance to the collars 113 and/or 114, so that at least one of the collars is bracketed between the fork prongs, whereby the axial position of the valve piston is secured.

The slot 181 in the ridge 180 can be produced, e.g., by a milling or boring operation. The ridge can be formed in the casting process of a cast housing of the control device.

It is advantageous if the slot is produced by a milling operation in two steps from both sides of the ridge, so as to produce a slot that is narrower than the diameter of the milling tool.

According to a further advantageous embodiment, it is practical if the groove 181 simultaneously functions as seating recess and swivel fulcrum for the lever.

FIG. 3 further shows the retainer fork 175 located at one end of the spring element 173 and preferably designed as an integral unit together with the spring element 173. The retainer fork 175 is engaged in a groove of a tube-shaped element 190, whereby the latter is secured in its axial position. The arrangement preferably consists of two concentric or nearly concentric tubes, where the retainer fork secures the axial position of the radially outer tube 190. The position of the retainer fork 175 is also secured by means of the screw 174.

Figure 4A:
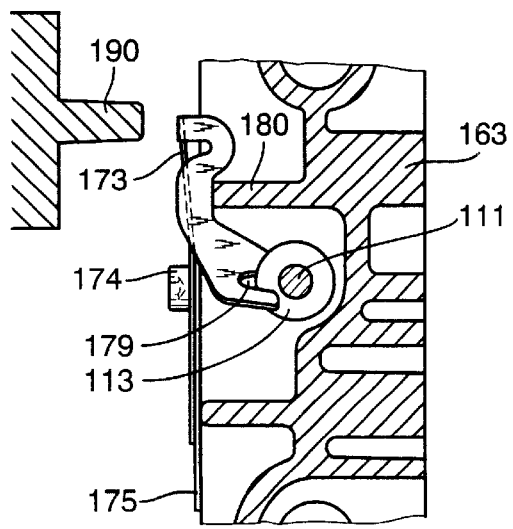
FIG. 4a represents a sectional view of the safety element and the valve piston.
Figure 4B:
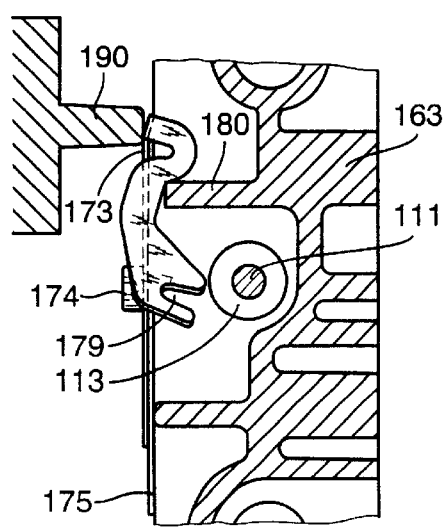
FIG. 4b represents a sectional view of the safety element and the valve piston.

FIGS. 4*a* and 4*b* represent a sectional view of portions of the housing 163 of the control device 160 and the valve piston 111. FIG. 4*a* shows the safety element 170 in the position where it secures or immobilizes the axial position of the valve piston 111, while FIG. 4b shows the safety device 170 in the swivelled position where the axial mobility of the valve piston 111 is released.

FIG. 4a shows how the spring element 173 acts on the lever 170, so that the mouth 179 of the fork grips the collar 113 of the valve piston 111, whereby the latter is axially secured. The lever 170 can swivel about the ridge 180. In the condition illustrated in FIG. 4a, the lever arm 171 is not engaged by the cam or the protrusion 190 of the transmission housing or another part of the motor vehicle.

In FIG. 4b, the cam or the protrusion 190 of the transmission housing or another part of the motor vehicle engages the lever arm 171 of the safety element and swivels the lever about the ridge 180, so that the axial position of the valve piston is released, because the mouth 179 of the second lever arm has been retracted from the collar 113.

It is particularly advantageous if the valve piston is secured by the safety element in position D (forward Drive with automatic gear selection). It can further be practical if the valve piston is secured in one of the positions R, N or P. The shift levels of the transmission are set through the axial position of the valve piston.

Figure 5:
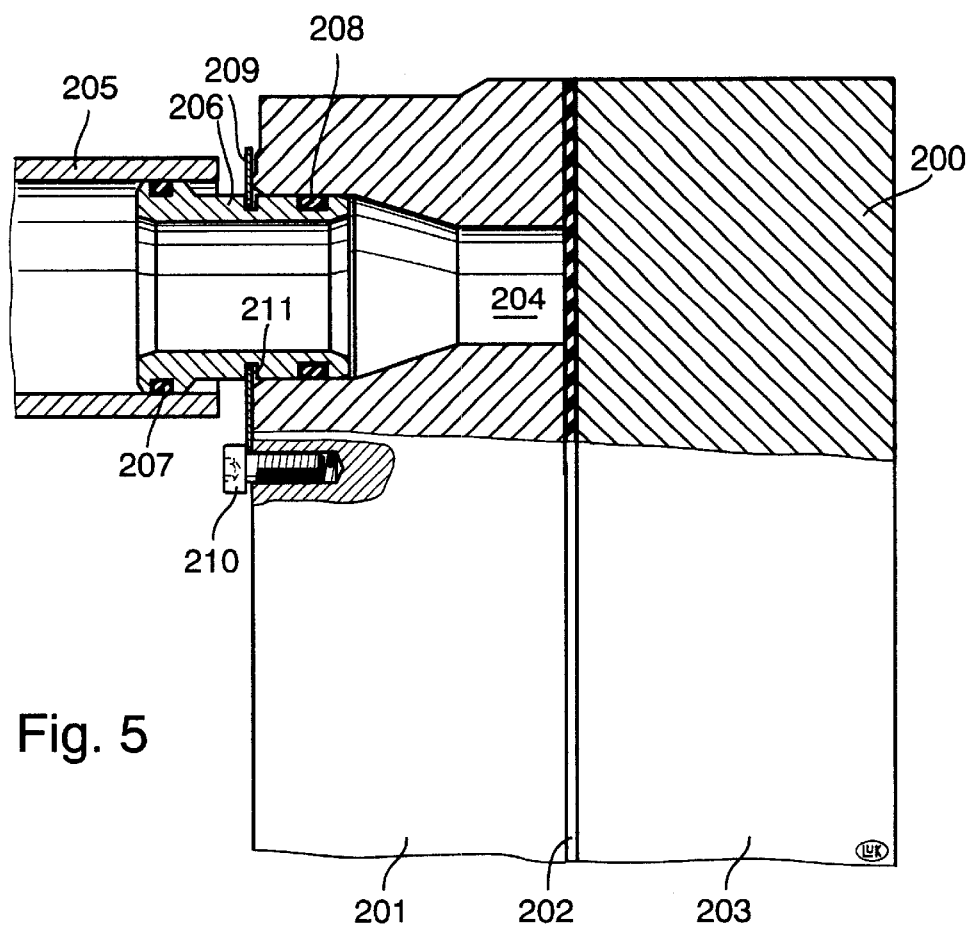
FIG. 5 represents a schematic view of the control device.

FIG. 5 gives a schematic view of the arrangement of a tubular element 206 in the area of the control device 200. The control device 200 essentially consists of two housing halves 201 and 203 containing an arrangement of valves and connecting channels, with the mating joint between the halves being sealed by a sealing layer 202. The sealing layer has openings for the connections between the two housing halves.

At least one of the housing halves contains a channel 204 that is open to the outside and in which a tubular element 206 is at least partially engaged. The element 206 is also at least partially engaged in a bore hole of a shaft 205 of a transmission and thereby establishes a passage for fluid to flow between the control device 200 and the shaft 205, where the control device 200 is fixed on the transmission housing while the shaft 205, is rotatable in relation to the transmission housing.

The tubular element 206 has seals 207 and 208 seated in grooves, in order to seal the fluid connection between the control device 200 and the shaft 205. The tubular 206 element is axially secured by a retainer fork 209 that is engaged in a groove 211 of the tubular element 206 and connected to the housing 200 by a screw 210. The tubular element 206 is further covered in DE 198 26 747 which, as mentioned previously, is included by reference in the background of the present application. The retainer fork is a part of the holder element for securing the tubular part. The holder element, which is preferably configured as a single, integral unit together with the spring element and the safety element, is held in position by the screw that connects the holder element to the housing of the control device and by the seating engagement of the lever in the slot of the ridge.

This application is further related to the German patent applications DE 199 43 009, DE 199 43 012, and DE 199 43 927, whose content (and also the content of subsequent applications based on the priority of the original German applications) is expressly included by reference in the disclosure of the present application.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A hydraulic control device for a transmission of a motor vehicle, wherein the transmission comprises a transmission housing and has shift levels; said control device comprising a control device housing with a bore hole, a valve piston contained in the bore hole and slidable between different axial positions, the shift levels of the transmission being determined by setting the axial position of the valve piston, and a safety element for securing the valve piston against axial movement prior to installation of the control device on a part of the motor vehicle, the safety element being configured so that installation of the control device will cause the safety element to release the valve piston for axial movement.

2. The hydraulic control device of claim 1, wherein the valve piston has a projection and the safety element is a swivelably supported lever with a first lever arm comprising a fork that engages the projection.

3. The hydraulic control device of claim 1, wherein the valve piston has a recessed portion in relation to adjacent portions of the valve piston and the safety element is a swivelably supported lever with a first lever arm comprising a finger that engages the recessed portion.

4. The hydraulic control device of claim 1, wherein the transmission housing has a protrusion and the safety device comprises a swivelably supported lever with first and second lever arms, said first lever arm securing the valve piston against axial movement, and wherein further said installation causes the protrusion to push against the second lever arm and thereby displacing the first lever arm so that the latter releases the valve piston for axial movement.

5. The hydraulic control device of claim 1, wherein the safety element is a two-armed lever.

6. The hydraulic control device of claim 1, wherein the safety device comprises a swivelably supported lever with first and second lever arms and a spring element connected to the second lever arm, said spring element serving to bias the first lever arm towards the Valve piston.

7. The hydraulic control device of claim 6, wherein the spring element is attached to the control device housing.

8. The hydraulic control device of claim 6, wherein the lever and the spring element are configured as a single integral unit.

9. The hydraulic safety device of claim 6 wherein the lever is substantially inflexible with regard to bending while the spring element is resiliently flexible with regard to bending.

10. The hydraulic control device of claim 6, further comprising a holder element for securing a further component of the hydraulic control device, wherein the spring element and the holder element together are configured as a single integral unit.

11. The hydraulic control device of claim 10, wherein the holder element is a retainer fork and the further component is a tubular element, and wherein further the spring element has an end connected to the retainer fork and the retainer fork is engaged in the tubular element, whereby the latter is secured against axial movement.

12. The hydraulic control device of claim 11, wherein the single integral unit further includes the lever.

13. The hydraulic control device of claim 1, wherein the safety device comprises a sheet metal part.

14. The hydraulic control device of claim 1, wherein the safety device is made of spring steel.

15. The hydraulic control device of claim 1, wherein the control device housing has a ridge, the safety device comprises a lever, and the lever is swivelably supported on the ridge.

16. The hydraulic control device of claim 1, wherein said part of the motor vehicle is the transmission.

* * * * *